Nov. 10, 1931.  R. S. ALLYN  1,830,778
METAL WORKING MECHANISM
Original Filed April 26, 1929  2 Sheets-Sheet 1
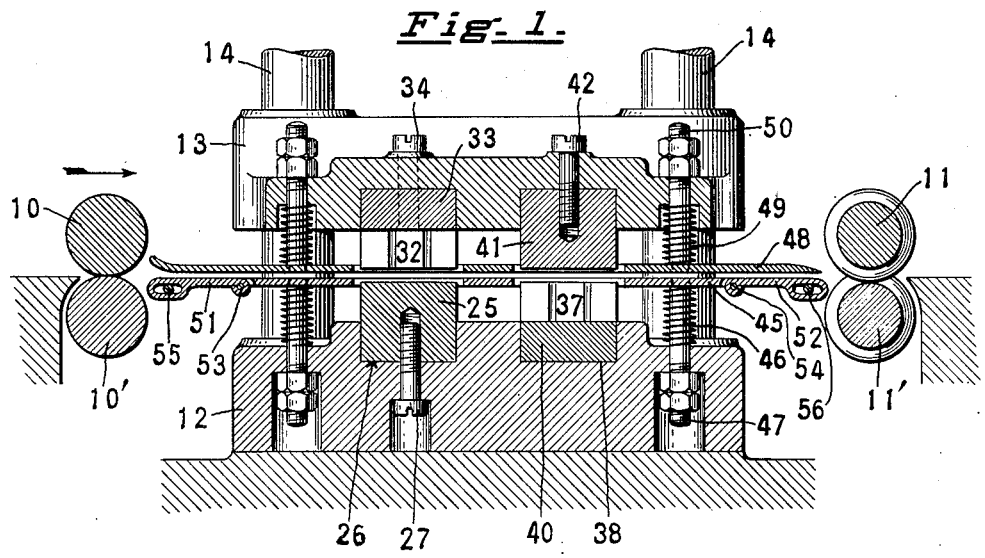
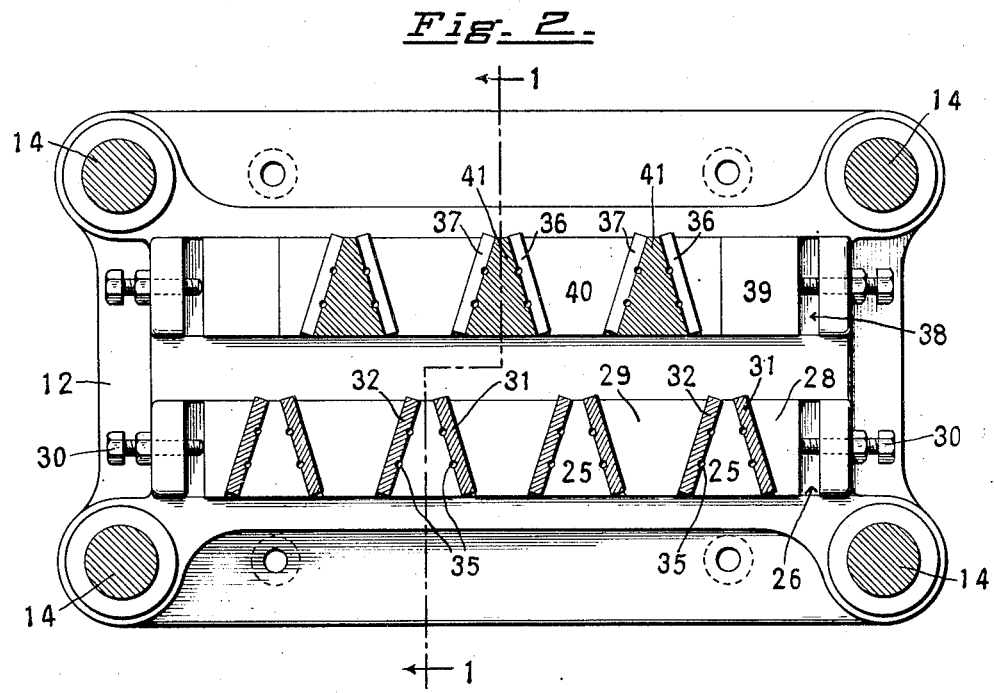
INVENTOR
*Robert S. Allyn,*
BY
ATTORNEY

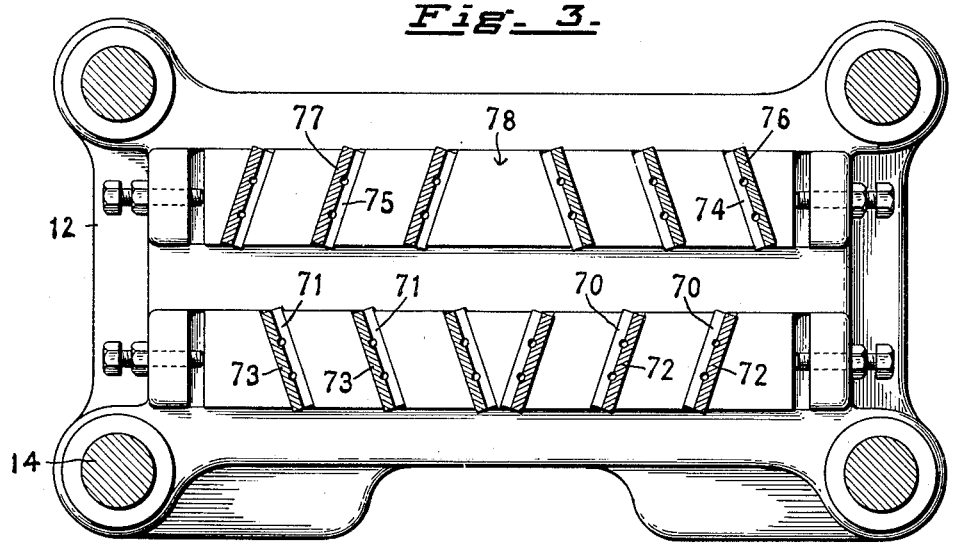
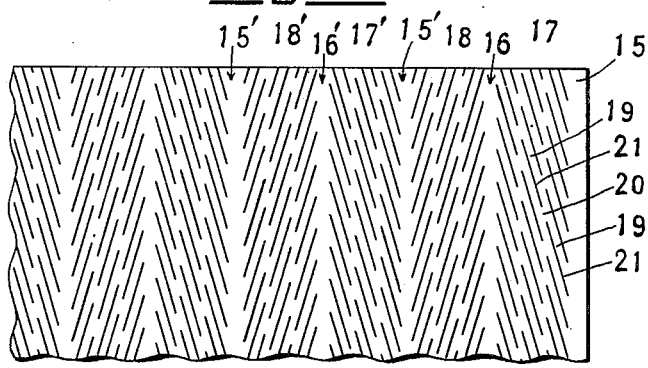
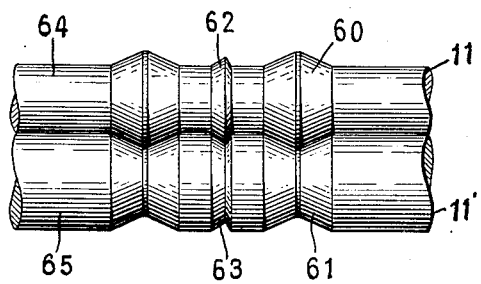

Patented Nov. 10, 1931

1,830,778

UNITED STATES PATENT OFFICE

ROBERT S. ALLYN, OF BROOKLYN, NEW YORK, ASSIGNOR TO HIMSELF AS TRUSTEE

METAL WORKING MECHANISM

Original application filed April 26, 1929, Serial No. 358,201. Divided and this application filed September 27, 1930. Serial No. 484,740.

My invention relates particularly to mechanism for slitting sheet metal along rows inclined to the length of the sheets preparatory to expansion in the manufacture of metal laths or fabrics such as shown in the Clark Patent 930,350.

U. S. Letters Patent 1,146,554, 1,224,523 and 1,314,507 show various mechanisms for slitting metal to produce slitted sections alternating with unslitted strips or ribs preparatory to its expansion for instance according to methods of the Clark Patents 979,130, 1,052,888, 1,104,477 and 1,224,877.

My present invention is intended to provide simple and reliable mechanism for slitting the stock along inclined rows according to the desired pattern as it is fed through the machine. Mechanisms of this character usually employ stationary dies and vertically reciprocating punch members which are provided with vertical posts, guides or pillars which guide the punch and die cutters in their proper relation. It has been found that in such slitting mechanism there is a substantial horizontal thrust on the guides. This is believed to be due to the creeping of the stock caused by the flexing thereof at the shearing points away from the cutting edges of the stationary cutters. This thrust of course produces friction and wear on the guides and cutters and also tends to pry the punches away from the dies and drag the stock over the edges of the dies so as to produce irregular and uneven cuts which make the subsequent expansion very difficult and sometimes impossible.

I have accordingly rearranged the punch and die cutters so as in effect to balance the horizontal shearing stresses not only laterally of the direction of feed but longitudinally as well and thus relieve the guide-pillars or posts of the friction heretofore due to the shearing action. By such means it is possible to increase the speed, reduce the wear on the guides as well as on the cutters, prevent vibration and produce a more uniform product. As an incident more or less to these features the cutters may have a longer life. This of course reduces the cost of the cutters for a given output.

It also reduces the labor of replacement and adjustment and makes it possible to keep the slitting machine in operation a greater length of time.

To effect this balanced shearing stress the cutters are arranged so that one half of the punches cut the strands downwardly in front of the coacting dies and one half of the punches cut the strands in rear of the respective coacting dies, thus balancing the thrusts longitudinally. One half of the punches cut the strands downwardly to the right of their dies and one half cut their strands to the left thus balancing the thrusts laterally. As part of the strands are thus formed behind the dies it is necessary to lift them over the dies in order to permit feeding. I therefore flatten or crush these strands somewhat, preferably by means of spring pressed strippers, so as to ensure more uniform slitting. By properly bending the strands or the ribs or both strands and ribs the stock may be expanded subsequently in various ways.

Fig. 1 is a longitudinal sectional view of one form of mechanism embodying my invention.

Fig. 2 is a plan view and section of the dies and punches specially arranged for balanced shear.

Fig. 3 is a plan view and section showing another modification in which plate cutters are arranged to produce a balanced shear.

Fig. 4 is a fragmentary detail showing one pattern of slitted stock.

Fig. 5 is a front view of a fragment of feed-out rolls.

The stock is fed into the machine intermittently by rolls 10—10' and fed out intermittently by the rolls 11—11'. The die holder 12 is suitably mounted in the machine and the punch holder 13 is guided on the posts and pillars 14 and actuated intermittently in the usual manner. It will be understood of course that the feed of the rolls may be adjusted to control the widths of the strands in the usual manner and that the stroke of the punch may also be adjusted in any usual manner.

A typical slitting pattern is shown in Fig. 4, where there are unslitted marginal and interior main strips or ribs 15—15' and unslitted intermediate strips or ribs 16—16' which may be narrower. The sections 17 and 18 are slitted along lines inclined in opposite directions. Each slitted section is composed of inclined strands 19—19 connected by bonds 20. The slits 21 are formed by the intermittent action of the cutters as the stock is fed through the machine.

As set forth in the Clark patents the cutters may be either wedge shaped with cutting edges on their opposite faces or in the form of plates held in position by wedges or inclined blocks. In the form shown in Figs. 1 and 2 the punch and die cutters are arranged in two rows spaced apart from each other longitudinally. The die cutters 25—25 in the rear row are wedge shaped, located in a groove 26 and individually clamped or held in place by screws 27. Wedge shaped blocks such as 28 and 29 may be employed to assist in holding the cutter blocks laterally and set screws 30 may be provided to apply lateral pressure. The punch cutters for this row consist of pairs of plates 31 and 32 held in place in the punch holder by means of spaced blocks 33, clamp screws 34 or other suitable means. The co-operating edges of the punch and die cutters are provided with notches such as 35 so that each punch plate and the corresponding coacting cutting edge of a die block will form three short slits leaving bonds 20 as above set forth.

The die cutters in the front row consist of plates such as 36 and 37 similar to the punch plates 31 and 32 and are held in a transverse groove 38 by means of blocks 39 and 40 and clamps and set screws similar to those above described. The co-operating punch cutters 41 are similar to the wedge shaped die cutters 25 and are held in place by set screws such as 42 and so forth.

Each punch cutter 31 shears the stock downwardly in front of and to the right of the coacting cutting edge of the wedge shaped die cutter 25. Punch cutter 32 shears stock in front of and to the left of the die cutter 25. The transverse shearing stresses are thus balanced in each unit of the rear set of cutters as the reverse-lay of strands is cut in the sections 17 and 18. There is, however, an unbalanced forward thrust on the pillars or guides 14 as the punches slip forwardly over the edges of the dies.

In a similar manner the shearing units in the front row are individually balanced transversely but produce a rearward unbalanced thrust since the punch cutters cut strands downwardly and to the rear of the dies in forming the slitted sections 17' and 18'.

Each shearing unit in the front row therefore provides a rearward thrust longitudinally of the feed to counterbalance an equal but opposite forward thrust from a similar unit in the rear row.

In order to prevent the stock from sticking to the punch and die cutters I provide suitable stripping plates as shown in Fig. 1. The stripping plate 45 is supported on springs 46 and adjusting studs 47, and provided with suitable passages for the die cutters. This plate is adjusted to a height slightly above the upper face of the die cutters and is adapted to be depressed when the punch member impacts against it. The upper stripper plate 48 carried by the punch member is similarly pressed downwardly by springs 49 and provided with adjusting studs 50 so that its lower face may normally be slightly below the lower face of the punch cutters.

The front and rear edges of the die stripper 45 are preferably provided with introductory and delivery guide portions 51 and 52, hinged to the stripper 45 at 53 and 54 and provided with guide pins 55, 56 so that as the main body of the stripper plate is adjusted up and down to correspond with the height of the die cutters, the edges of the guide plates near the feed rolls will remain substantially on a level with the sheet which is fed through the rolls 10—10' and delivered to the rolls 11—11'.

By suitably shaping and adjusting the upper and lower stripper plates they may be made to bear on the slitted stock after each stroke of the press so as to somewhat crush or flatten the strands as they are formed. The lower or die stripper plate 45 is especially essential beneath those punch cutters which draw the stock down in rear of the dies, for instance beneath the punch cutters 41, since it is necessary to lift the strands thus formed up sufficiently to clear the faces of the dies 36 and 37. It is also quite desirable that the punch stripper 48 engage these depressed strands at the next slitting stroke so as to steady them while the next row of slits is being formed.

It will be understood of course that the length of the cutting edges of the punch and die members and the spacing of the shearing units will be designed to produce the desired length and number of strands and the desired width of unslitted strips or ribs.

When it is desired to give special inclination to the strands or ribs the feeding out rolls 11—11' may be provided with specially shaped conical portions, such as 60—61, for setting the strands, and with beads and grooves 62, 63 for setting the ribs, as shown in Fig. 5. The slitted sections may be flattened if desired by the cylindrical portions 64—65 of these rolls.

In the arrangement shown in Fig. 3 I have shown plate cutters for both punches and dies arranged in two rows spaced apart from each other in the direction of the feed. In the rear row the die cutters 70—70 are inclined opposite to the die cutters 71—71. The punch cutters 72—72 and 73—73 are arranged to coact with the die cutters 70 and 71 respectively so that the shearing stresses of the units in the rear row are balanced laterally but unbalanced longitudinally. The die cutters 74 on one side of the center are inclined in an opposite direction to the die cutters 75 on the other side of the center and the punch cutters 76 and 77, coact with them respectively. The cutters in the front row are reversely inclined and arranged to produce a laterally balanced shear and a longitudinally unbalanced shear which offsets the unbalanced longitudinal shear produced by the rear row of cutters.

The central space 78 between the right and left hand sets of cutters is slightly wider than the area slitted by the two central plates or cutters in the rear row. The cutters in the rear row are lined up with the spaces between the cutters in the front row so as to leave the necessary unslitted strips to form the ribs of the fabric after it is expanded.

It will be seen that in this form there are just as many shearing units in the front row as in the rear row so that the horizontal thrusts are fully balanced leaving the posts 14 to act as guides with a minimum of friction.

There are four groups or sets of punch and die cutters, i. e., first—the cutters 72—70 which shear strands to the right and rear of the die cutters 70, second—the cutters 73—71 which shear strands to the left and rear of the die cutters 71, third—the cutters 76—74 which shear strands to the right and forwardly of the die cutters 74, and fourth the cutters 77—75 which shear strands to the left and forwardly of the die cutters 75.

In the form shown in Fig. 2, the left hand edges of the punch cutters 41 and the right hand edges of die cutters 37 correspond with the first group, the right hand edges of cutters 41 and the left hand edges of the cutters 36 correspond with the second group, cutters 31 and 25 correspond with the third group and cutters 32 and 25 correspond with the fourth group. Each row of cutters thus contains two groups which balance each other laterally and the cutters of each row balance or approximately balance the cutters of the other row. There is therefore no substantial thrust on the guide posts due to unbalanced horizontal shearing stresses.

This application is a division from 358,201 filed April 26, 1929, now Patent 1,781,533 dated Nov. 11, 1930.

I claim:

1. In a metal slitter, means for feeding a sheet, two rows of die cutters having their cutting edges inclined with respect to the direction of feed, some of the cutters in each row being inclined in the opposite direction to the remainder of the cutters in the same row, the cutters at the opposite sides of the center line in one row being parallel respectively to the cutters at the opposite sides of the center line in the other row and punch cutters coacting with the respective die cutters, some of the punch cutters being arranged to cut strands in front of the coacting die cutters and other punch cutters being arranged to cut strands in rear of the corresponding die cutters.

2. In a metal slitter, means for feeding a sheet forwardly, and coacting punch and die cutters arranged in two parallel rows extending transversely of the direction of feed for forming reversely slitted strand sections, all the cutting edges being inclined relative to the direction of feed, one half of the cutting edges being inclined toward the right and the other half being inclined toward the left, one half of the punch cutters cutting to the right of the coacting die cutters and the other half of the punch cutters cutting to the left of the coacting die cutters.

3. In a machine for slitting sheet metal, means for feeding sheets in a certain direction, and a number of pairs of coacting punch and die cutters arranged in spaced rows with their cutting edges inclined to the direction of feed, some cutters being inclined in the opposite direction to others, some of the punch cutters cutting the stock in front of the corresponding die cutters and others of the punch cutters cutting the stock in rear of the coacting die cutters, some of the punch cutters cutting the stock off the right hand sides of the coacting die cutters and others of the punch cutters cutting the stock off the left hand sides of the coacting die cutters.

4. In a metal slitter, feeding means, parallel spaced rows of die cutters having their cutting edges inclined with respect to the direction of feed, half of the cutters in each row being inclined in the opposite direction to the remainder of the cutters in the same row, the cutters at one side of the center line in each row being parallel to the cutters at the opposite side of the center line in the other row and punch cutters coacting with the respective die cutters.

5. Slitting mechanism comprising punch and die members having coacting cutters arranged in two rows extending transversely of the direction of feed of the stock, means for feeding the stock between the punch and die members, guides for maintaining the punch member in its proper relation to the die member, the die cutters in one row being in wedge shape form with cutting edges inclined relative to the direction of feed of the stock, punch cutters in the other row being of wedge shape with cutting edges inclined to the direction of feed.

6. Slitting mechanism comprising punch and die holders each having two transverse grooves, one in front of the other, guide members for the punch holder, means for feeding stock between the punch and die holders, two rows of punch and die cutters mounted respectively in the grooves of the punch and die holders and arranged transversely of the direction of feed, one row being in front of the other, the cutters in each row being arranged in pairs spaced apart from each other laterally, all of the cutters being inclined with respect to the direction of feed and one cutter of each pair being inclined in the direction opposite to the other cutter of said pair so as to produce a reverse lay pattern of slitting.

7. Slitting mechanism comprising punch and die members having cutting edges spaced and inclined to form inclined strands connected by longitudinal unslitted strips, said punch and die members being arranged in two rows extending transversely of the direction of feed and spaced apart from each other, a reciprocable cross head carrying the punch members, a spring supported stripper plate having openings for the die members, a spring pressed stripper plate actuated by the cross head and having openings for the punch members, a guide plate having one end movable up and down with the spring supported stripper plate, means for feeding stock to said guide plate and means for maintaining one edge of the guide plate at the approximate level of the feeding means.

8. Slitting mechanism comprising punch and die holders, means for feeding stock longitudinally between said holders, guides for the punch holder and two rows of punch and die cutters arranged transversely in the holders and all inclined with respect to the direction of feed of the stock, approximately one-half of the cutting edges being inclined in one direction and approximately one-half of the cutting edges being inclined in an opposite direction with respect to the direction of feed, some of the punch cutters being arranged to cut stock forwardly of the coacting die cutters and others of the punch cutters being arranged to cut stock rearwardly of the coacting die cutters.

ROBERT S. ALLYN.